(No Model.)

J. C. NICHOLSON.
REVERSING VALVE GEAR FOR ENGINES.

No. 459,525. Patented Sept. 15, 1891.

Witnesses:

Inventor
James C. Nicholson
By Dewey & Co.
attys

UNITED STATES PATENT OFFICE.

JAMES C. NICHOLSON, OF SAN FRANCISCO, CALIFORNIA.

REVERSING VALVE-GEAR FOR ENGINES.

SPECIFICATION forming part of Letters Patent No. 459,525, dated September 15, 1891.

Application filed April 22, 1891. Serial No. 390,037. (No model.)

*To all whom it may concern:*

Be it known that I, JAMES C. NICHOLSON, a citizen of the United States, residing in the city and county of San Francisco, State of California, have invented an Improvement in Reversing Valve-Gears for Engines; and I hereby declare the following to be a full, clear, and exact description of the same.

My invention relates to a novel reversing valve-gear for engines.

It consists in certain details of construction, which will be more fully explained by reference to the accompanying drawings, in which—

Figure 1:
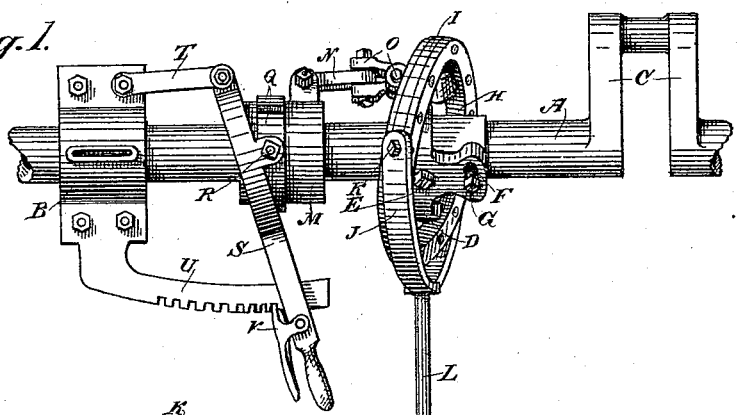
Figure 2:
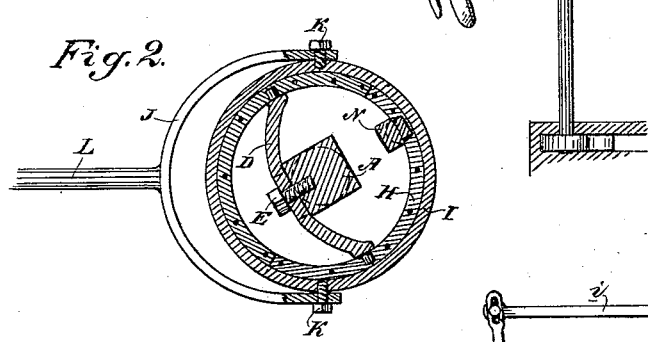
Figure 3:
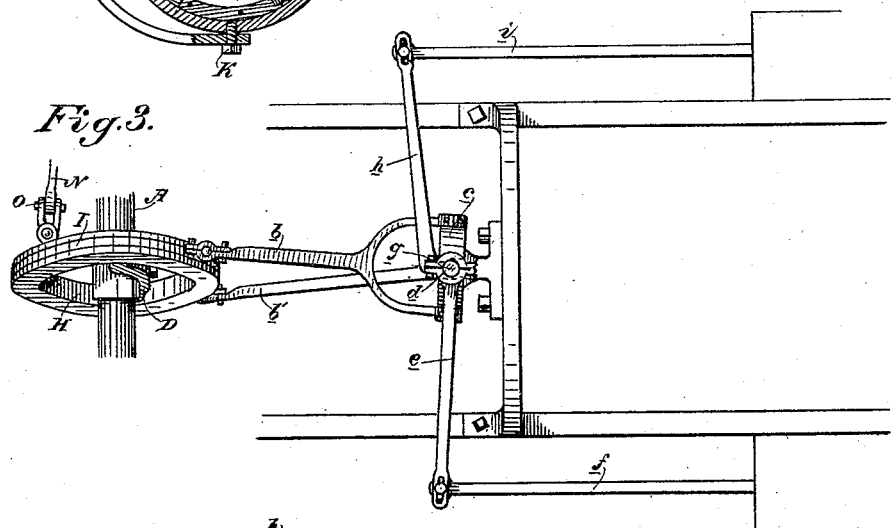
Figure 4:
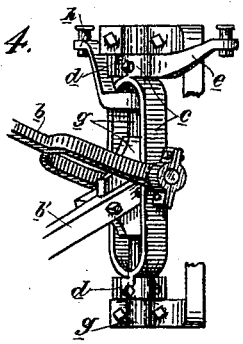

Figure 1 is a plan view of my device as applied to a rotary valve. Fig. 2 is a vertical section through the eccentric rings and their connections. Fig. 3 shows a plan view of the device as applied to slide-valves. Fig. 4 shows an elevation of the lever connections.

A is the main shaft of the engine, journaled at the ends B and having upon it the crank C. Upon this shaft is fixed a yoke D, which is properly secured to the shaft by a bolt E, about which it is movable, or in other suitable manner, and projecting to one side of it is a portion having a curved slot F, through which passes a holding-screw G. By means of this holding-screw the yoke may be turned to stand at a greater or less angle with the longitudinal axis of the shaft. Upon the outer ends of this yoke an annular ring H is fixed or pivoted, and this ring is fitted into a channel made upon the inner side of another annular ring I, within which it is free to travel whenever the shaft is rotated. This outer ring is inclosed by a semicircular yoke J, which is pivoted to it at top and bottom, as shown at K, and in a line which passes transversely through the axis of the shaft. To the center of this semicircular yoke J and at right angles with the line of its pivots is fixed a rod or shaft L, which extends to the valve and is connected therewith.

In Fig. 1 I have shown the valve as being of the rotary pattern, and it is actuated by the oscillation of its rod L, and this oscillation is produced by means of the ring H, mounted obliquely to the plane of rotation of the axis at the end of the yoke-arms D, and rotating within the exterior channeled ring I, to which the valve-rod is connected.

It will be manifest that the angle at which the yoke D is set upon the axis will govern the eccentricity of the rotation of the ring fixed to the ends of its arms, and thereby the amount of oscillation of the valve-rod and valve. This is adjusted by means of the screw G before described, so as to give the valve the proper amount of lead. In order to reverse this valve-gear, I have shown a mechanism consisting of the following parts: M is a collar mounted loosely to allow it to slide upon the shaft and connected by a rod N and a suitable universal joint O with the interior rotary rotating ring H. This collar, which fits loosely upon the shaft, but turns with it, has a groove or channel made in its outer periphery and a cut ring or segments Q are fitted into this groove or channels. By means of pivot-pins R these segments are connected with a lever S, which is fulcrumed at one side by means of the link T. The other end of this lever extends to a suitable distance to give the proper power for operating it and moves over a rack U. By means of a spring-pawl V the lever is locked to the notches of the rack at any desired point. When in the center, the eccentrically-moving ring will be held at such a point that the valve will have no motion to admit steam. When the lever is thrown to one side of this central point, the angle of this eccentrically-rotating ring will be such as to admit steam to the engine for the forward motion thereof, and when thrown to the opposite side of the center the engine will be reversed so as to run backward. The movement of the valve is regulated to cut off steam at any desired point by notches intervening between the ends and center of the arc in the same manner as for ordinary link motion. The yoke D, adjustably fixed to the shaft as previously described, connects with the grooved annular ring H, which in this case turns with the yoke and the shaft. Around the outside of this ring is made a groove or channel, into which is fitted the ring I, which is non-rotating, as previously described. Connected with this ring at points equidistant above and below a horizontal central line passing through the axis of the shaft are the rods $b\ b'$. The joint by which these rods are connected with the ring is a universal joint to accommodate itself to the eccentric movements of the ring caused by the peculiar oblique mounting upon and connection with the shaft.

c is a yoke in a frame situated at some distance from the engine-shaft, fulcrumed at top and bottom, as shown at d, and one of the connecting-rods b is connected with this yoke, so that the oscillations caused by the movements of the eccentric will cause the yoke to oscillate. From this yoke an arm e extends outward and is connected with the valve-rod f, so that the oscillations of the eccentric will operate the slide-valve in the usual manner. Within the yoke c is pivoted a vertical arm or frame g with which the other eccentric-rod b' is connected, and this arm or frame being free to oscillate inside of the first-mentioned yoke is operated by the arm b', which connects with the eccentrically-moving ring H below its center of oscillation, thus moving it in the opposite direction from the movement of the first-named yoke. A second arm h is connected with this arm or frame and by means of the rod i is connected with the slide valve of the opposite engine. This arrangement is specially adapted for use upon locomotives or other slide-valve engines which are used in pairs.

The reversing and cut-off mechanism operate in this device in the same manner as described in connection with the rotary valve.

Having thus described my invention, what I claim as new, and desire to secure by Letters Patent, is—

1. In an engine, a ring or disk supported upon the shaft in a plane oblique to its plane of rotation, a yoke connecting the disk with the shaft and having a curved slot and holding-screw whereby said yoke may be moved so as to change the angle of obliquity of the disk, and arms connected with the disk and intermediate between it and the valves, whereby the latter are reciprocated and the lead regulated, substantially as herein described.

2. In an engine, a ring or disk mounted obliquely upon the engine-shaft, a second ring or disk within the first one and adapted to travel thereon, a yoke connecting the disk with the shaft having a slot and holding-screw for moving the yoke so as to change the angle of obliquity of the disk to the shaft, a collar mounted upon the shaft so as to rotate therewith and to slide longitudinally upon the shaft, an arm or arms connecting said collar with the inner ring or disk at right angles with the points by which it is journaled upon the ends of its supporting-yoke, a ring or segments fitting a groove or channel in the sliding collar, and a lever fulcrumed at one side of the shaft connected with the collar-segments, and a toothed arc or rack over which it is moved to regulate the throw of the valves independent of the setting of the oblique ring, and the pawl by which said lever is held in any notch of the arc whereby the throw of the valves is reversed by moving the lever from one side of the center to the other, and the movement of the valves is stopped when said lever is placed on the center, substantially as herein described.

In witness whereof I have hereunto set my hand.

JAMES C. NICHOLSON.

Witnesses:
S. H. NOURSE,
GEO. H. STRONG.